United States Patent [19]
Barnard

[11] Patent Number: 4,681,512
[45] Date of Patent: Jul. 21, 1987

[54] SELF-FAIRING WINDMILL VANE

[76] Inventor: Maxwell K. Barnard, 1933 San Juan, Port Townsend, Wash. 98368

[21] Appl. No.: 871,243

[22] Filed: Jun. 6, 1986

[51] Int. Cl.⁴ .............................................. F03D 3/06
[52] U.S. Cl. ............................... 416/132 B; 416/117; 416/240; 416/197 A
[58] Field of Search ............... 416/240 A, 132 B, 119, 416/117, 197 A

[56] References Cited

U.S. PATENT DOCUMENTS

| | | | |
|---|---|---|---|
| 589,530 | 9/1897 | Knowlton | 416/240 A X |
| 662,737 | 11/1900 | Puszkar | 416/240 A X |
| 802,144 | 10/1905 | Harrington | 416/240 A X |
| 811,218 | 1/1906 | Harrington | 416/240 A X |
| 1,352,952 | 9/1920 | Gracey | 416/240 A X |
| 2,677,344 | 5/1955 | Annis | 416/240 A X |
| 3,810,712 | 5/1974 | Hillman | 416/117 |
| 3,995,170 | 11/1976 | Graybill | 290/55 |
| 4,191,507 | 3/1980 | DeBerg | 416/117 |
| 4,527,950 | 7/1985 | Biscomb | 416/117 |

FOREIGN PATENT DOCUMENTS

| | | | |
|---|---|---|---|
| 100039 | 5/1925 | Austria | 416/202 |
| 144591 | 2/1936 | Austria | 416/119 |
| 2721103 | 11/1978 | Fed. Rep. of Germany | 416/117 |
| 2289767 | 5/1976 | France | 416/240 A |
| 2288232 | 5/1976 | France | 416/131 R |
| 40378 | 12/1957 | Poland | 416/117 |
| 173578 | 12/1921 | United Kingdom | 416/240 A |
| 2071773 | 9/1981 | United Kingdom | 416/240 A |

OTHER PUBLICATIONS

Moretti and Divone, *Modern Windmills*, Scientific American, Jun. 1986, pp. 110-118.

*Primary Examiner*—Everette A. Rowell, Jr.
*Attorney, Agent, or Firm*—John O. Graybeal

[57] ABSTRACT

A windmill vane for use with a windmill having a vertical shaft. The vane comprises an open, rigid, planar, preferably semi-elliptical frame and a flexible sail on the frame. The frame can also be chevron shaped or semi-rectangular in shape. One end of the frame is affixed to the shaft, ad the other end is aligned therewith horizontally and radially outwardly from the shaft. The planar frame is oriented with a central portion leading the ends thereof relative to the instantaneous direction of movement of the frame around the shaft. The central portion of the frame is inclined at a 45° angle upwardly from the frame ends relative to such instantaneous direction of movement. The sail is light weight, resilient, and preferably carried by a loose sleeve around the frame. The design of the vane ensures that the sail is full when moving with the wind and streams directly behind the frame when moving across and against the wind.

19 Claims, 11 Drawing Figures

SELF-FAIRING WINDMILL VANE

BACKGROUND OF THE INVENTION

1. Technical Field

This invention relates to windmills, and more particularly to a windmill vane having only a rigid planar support frame oriented forty-five degrees (45°) relative to the instantaneous direction of movement of the vane, and a resilient sail mounted on the support frame.

An obstacle to modern use of wind power is the low cost-effectiveness of present windmill designs. Most simple, low-cost windmill designs convert too little of the available wind power into usable shaft power, while greater efficiencies have required more sophisticated and expensive designs. Windmills providing high power conversion efficiencies with simple designs using low-cost materials, have the potential of increasing the use of windmills as effective and reliable sources of energy.

The efficiency with which a windmill converts wind power into usable power depends primarily on the efficiency of the members which are acted upon by the wind. Windmills having a horizontal shaft and vertical vanes facing into the wind have existed since the latter part of the first millennium A.D., and were substantially perfected by the Dutch in the seventeenth century. The last two centuries have seen the birth and refinement of other windmill designs, in particular vertical shaft designs capable of extracting power from wind blowing in any direction. The efficiency of a vertical axis windmill depends primarily on the net efficiency of its vanes or sails. A windmill vane's net efficiency is defined as the difference between the power extracted from the wind when the vane is moving with the wind, less the drag produced when the vane is moving against the wind. Much inventive effort has been directed toward improving the net efficiency of vanes or sails for vertical axis windmills.

2. Description of the Prior Art

Graybill U.S. Pat. No. 3,995,170 shows a vertical axis windmill having vertical vanes with flexible sails 21, each sail being folded around a vertical post 17 when the vane is rotated against the wind. DeBerg U.S. Pat. No. 4,191,507 shows a vertical axis windmill having horizontal vanes with flexible sails, each sail being fastened along its upper edge to a radially extending sail arm, and being tethered by a plurality of cords 40 to a radially extending cord arm spaced horizontally from and lower than the sail arm, such that the sail is lifted into a substantially flat position to provide little resistance to the wind when the vane is moving against the wind. Both DeBerg and Graybill rely on a large number of moving parts subject to wear and eventual failure, thus reducing the operating reliability and the means time between failures of their designs.

SUMMARY OF THE INVENTION

It is an object of the present invention to provide a windmill vane having increased net efficiency relative to prior designs for windmill vanes.

It is a further object of this invention to provide a windmill vane having increased operating reliability by reducing the number of moving parts subject to wear and eventual failure to a minimum.

It is another object of this invention to provide a windmill vane having a simplified design and suited to construction with simple, conventional materials.

These and other objects are provided by a windmill vane comprising a rigid, generally open planar frame standing out from and carried by the shaft of a horizontal or vertical axis windmill, and on which a simple sail-type vane is mounted. The frame can be disposed radially outwardly from the shaft, or parallel to the shaft and spaced outwardly therefrom. The windmill shaft is journalled for rotation, and is rotated in a selected direction by the wind blowing against a plurality of vanes and causing the vanes to move around the axis of the shaft, thereby rotating the shaft in the selected direction. The frame has a central portion and first and second ends, and is oriented in a plane with the central portion of the frame leading the ends thereof relative to the instantaneous direction of movement of the frame around the shaft. For maximum efficiency, the frame is inclined at an angle of about forty-five degrees (45°) relative to such instantaneous direction of movement. A light weight, resilient substantially wind resistant sail is arranged on the frame, extending continuously between a head edge securely attached along the frame, and a foot edge extending continuously between the first and second ends of the frame. The orientation of the frame and the length of the foot edge of the sail ensure that the sail is full when moving with the wind and streams essentially behind the frame with minimal drag when moving across and against the wind, so as to maximize the net efficiency with which the vane transfers power from the wind to the windmill shaft.

Other features and advantages of the present invention will become apparent from the following detailed description of typical embodiments thereof, taken in conjunction with the accompanying drawings.

DESCRIPTION OF THE PREFERRED EMBODIMENTS

Figure 1:
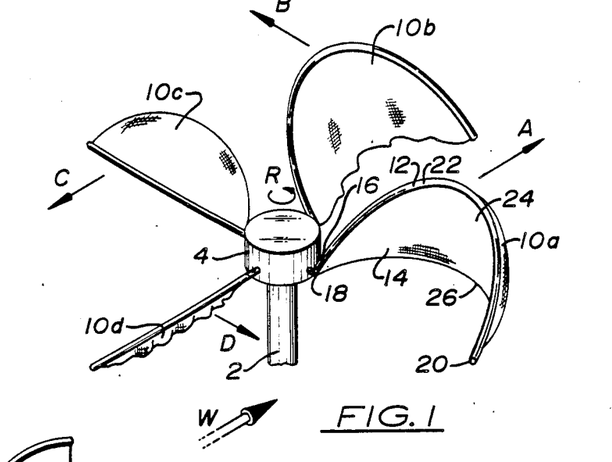
FIG. 1 is an isometric view of a vertical axis windmill with vanes according to the presently preferred embodiment of the invention having semi-elliptical support frames.
Figure 2:
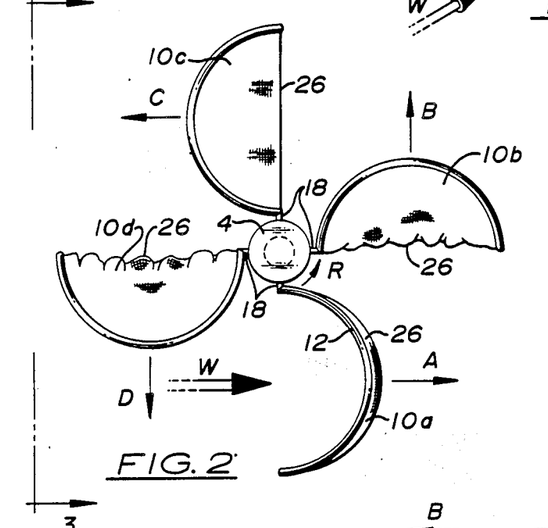
FIG. 2 is a plan view of the windmill of FIG. 1.
Figure 3:
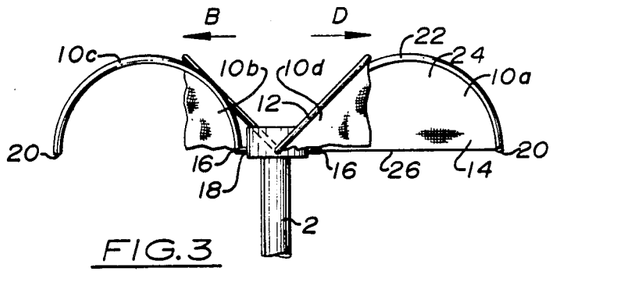
FIG. 3 is an elevational view of the windmill of FIG. 1

As best seen in FIGS. 1-3, the preferred embodiment of the present invention is used in a windmill having a vertical shaft 2 and a mounting hub 4. The hub 4 is journalled for rotation in a selected direction of rotation R around the vertical longitudinal axis of the shaft. The hub 4 can be journalled on the shaft 2, or it can be fixedly attached to the shaft 2 and the shaft journalled on a base. A plurality of vanes 10a,10b,10c,10d are disposed quadrantly on the hub 4. The vanes 10a,10b,10c,10d each comprise a frame 12 and a flexible resilient sail 14 secured to the frame. The frame 12 of each of the vanes 10a,10b,10c,10d is semi-elliptical in shape, and the sail 14 when full has the shape of a generally cylindrical segment defined by the two planes, one perpendicular to the axis of the cylinder and one at forty-five degrees (45°) to the axis, which intersect along the minor axis of the semi-elliptical frame and a diameter of the cylinder. As the hub 4 rotates in the selected direction of rotation R, the respective instantaneous direction of movement of each vane 10a,10b,10c,10d around the axis of the shaft is shown by A,B,C,D.

Each frame 12 has a proximal end 16 securely carried on the hub 4 by a short rigid mounting member 18 extending radially and horizontally outwardly from the circumferential surface of the hub. A first end of the mounting member 18 is fixedly attached to the surface of the hub. The distal end 20 of the frame 12 is spaced radially outwardly from the hub 4. The distal end 20 is aligned horizontally and radially with the proximal end 16 of the frame. As shown in FIG. 2, the frame 12 of each vane 10a,10b,10c,10d extends in a half-ellipse between the proximal end 16 and the distal end 20, so that the frame forms an open curved structure oriented in a plane. A central portion 22 of the frame 12 is located midway between the proximal end 16 and the distal end 20 of the frame. An opposite second end of the mounting member 18 is fixedly attached to the frame 12 at some point between the proximal end 16 and the central portion 22. The plane of the frame 12 is oriented with the central portion 22 of the frame leading the proximal and distal ends 16,20 of the frame relative to the instantaneous direction of movement A,B,C,D of the vane around the axis of the shaft 2.

While the frame 12 is shown with the proximal and distal ends 16,20 in the same horizontal plane in the figures, it is to be noted that the distal end 20 might also be tilted upwardly or downwardly in all embodiments.

As best seen in FIG. 3, the plane of the frame 12 of each of the vanes 10a,10b,10c,10d is inclined at an angle of forty-five degrees (45°) upwardly relative to the respective instantaneous direction of movement A,B,C,D of such vane. For example, when the hub 4 is rotated in selected direction R, at a given moment vane 10d moves in instantaneous direction of movement D, which is both horizontal and perpendicular to the axis of the shaft 2. The plane of the frame 12 of vane 10d is inclined forty-five degrees (45°) upwardly from such direction D, such that the central portion 22 of the frame is leading and is positioned above the proximal and distal ends 16,20 of the frame of vanes 10d. Similarly, the planes of the frames 12 of vanes 10a,10b,10c are inclined upwardly at an angle of forty-five degrees (45°) relative to their respective instantaneous directions of movement A,B,C.

Figures 10, 11:
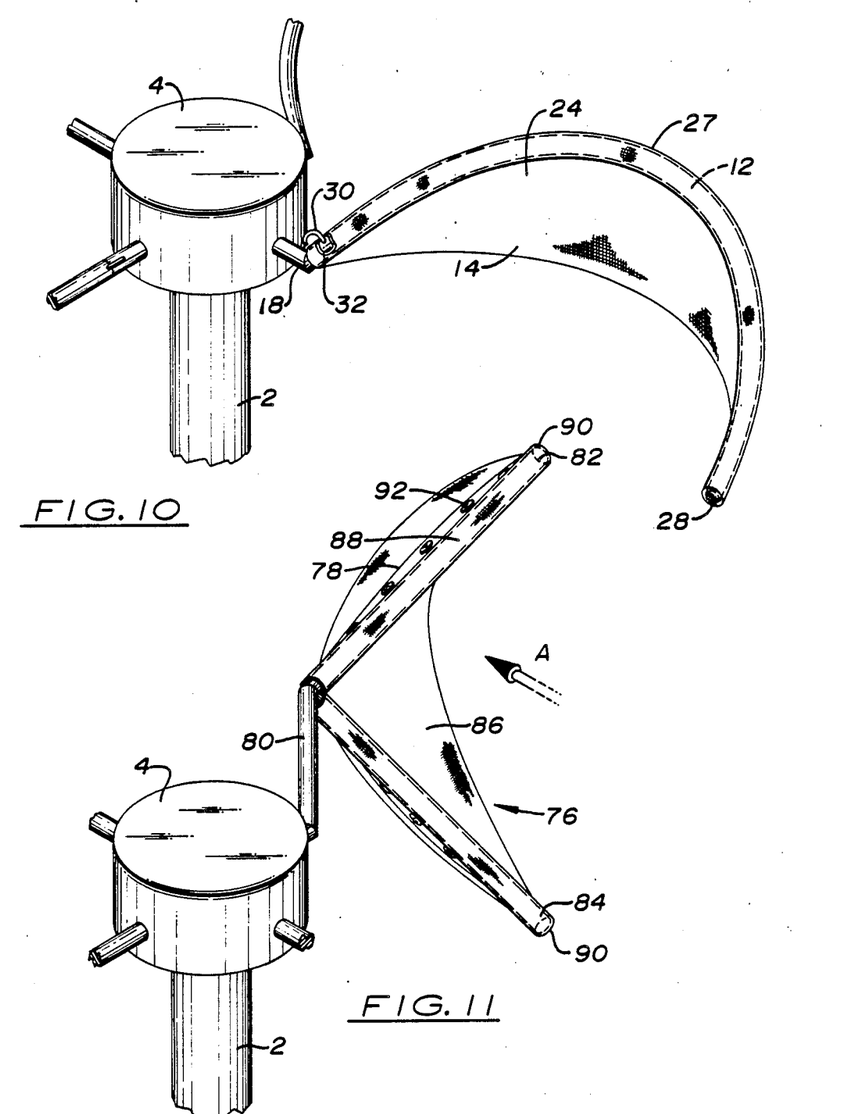
FIG. 10 is a detailed isometric view of the embodiment of FIGS. 1-3, showing the sleeve attaching the sail to the frame.
FIG. 11 is a partial isometric view of a vertical axis windmill, showing the shaft and a vertically oriented vane according to a third alternative embodiment of the invention.

The sail 14 of each vane 10a,10b,10c,10d extends continuously between an upper head edge 24 secured to the frame 12 of the vane, and a lower foot edge 26. The sail 14 is formed from a light weight, flexible, resilient material, preferably nylon fabric, for example. The head edge 24 of the sail 14 of the vane 10a,10b,10c,10d is preferably secured to the frame 12 of the vane by a sleeve 27 formed from the material of the sail and fixedly attached to the head edge 24 of the sail. As seen in FIG. 10, one end of the sleeve is closed to form a cup 28 so that sail 14 can be slipped onto the frame 12 until the distal end 20 is inside the cup. The other end of the sleeve 27 is fixed to a hook 30 on the proximal end 16 of the frame 12 by an elongated eyelet 32, thus keeping the sail spread along the length of the frame. The frame 12 fits loosely within the sleeve 27, thus securing the upper edge 24 of the sail upon the frame and allowing the sail to rotate around the frame. The eyelet 32 is elongated in a direction transverse to the frame 12 to allow the sleeve 27 to rotate freely around the frame. The general shape of the sail 14 as a segment of a cylinder involves the sail following the semi-elliptical shape of the frame 12 to provide a smooth, even fit thereon.

When a vane is positioned to be moving directly with the wind, as shown by vane 10a in FIGS. 1-3, the sail 14 is filled and the vane converts the wind power to shaft power at the hub 4 and shaft 2 with maximum efficiency. In this wind filled position, the foot edge 26 of the sail 14 extends substantially horizontally between the proximal and distal ends 16,20 of the frame and is vertically aligned directly beneath the curved frame 12, thus presenting an essentially vertical cupped surface against which the wind blows. As the vanes move around the axis of the shaft 2, they pass through a faired position where they are moving directly against the wind, as shown by vane 10c in FIGS. 1-3. For any given wind direction, the faired position is one hundred eighty degrees (180°) around the axis of the shaft 2 from the filled position. In the faired position, the force of the wind against the vane 10c reduces the efficiency of the windmill by reducing the net torque exerted on the hub 4 by the vanes 10a,10b,10c,10d. In the present invention the orientation of the frame 12 and the shape of the sail 14 combine to reduce the force of the wind against the vanes in the faired position, by fairing the sail directly behind the frame, thus presenting a minimal area to the wind. The sleeve 27 attaching the head edge 24 of the sail 14 to the frame 12 allows the sail to rotate freely around the frame. In the filled position, the sail is filled by the wind and is formed into a taut horizontally arching surface extending downwardly directly below the frame. The forty-five degree (45°) inclination of the plane of the frame 12 is important to the efficiency of the vane in that when a vane 10a,10b,10c,10d is in the faired position, the sail 14 of such vane is forced by the wind blowing past the vane to form a vertically arching surface extending horizontally directly and essentially entirely behind the frame. This arrangement of the sail 14 into a faired position behind the frame 12 exposes a minimum surface area of the vane to the wind, thereby minimizing the drag of the vane in the faired position, and maximizing the net efficiency of the windmill. The general shape of the sail 14 as a segment of a cylinder enables that the sail to stream relatively smoothly directly behind the frame 12 with a minimum of flapping when the vane is in the faired position.

Figures 4, 5:
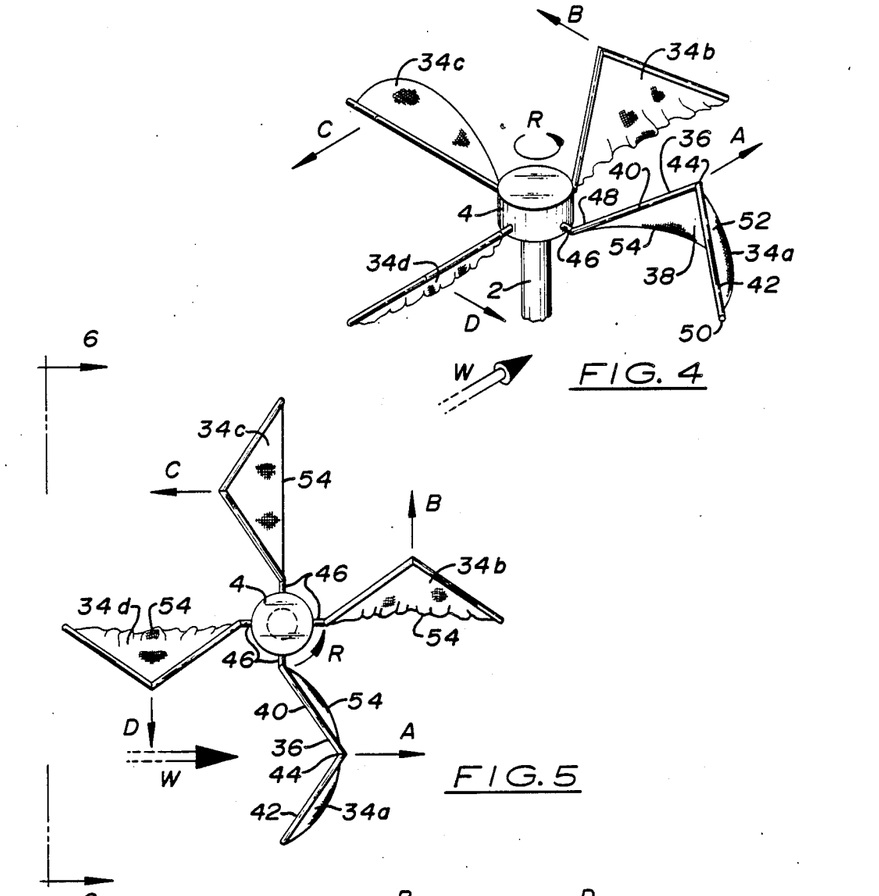
FIG. 4 is an isometric view of a vertical axis windmill with vanes according to a first alternative embodiment of the invention, having chevron shaped support frames.
FIG. 5 is a plan view of the windmill of FIG. 4.
Figure 6:
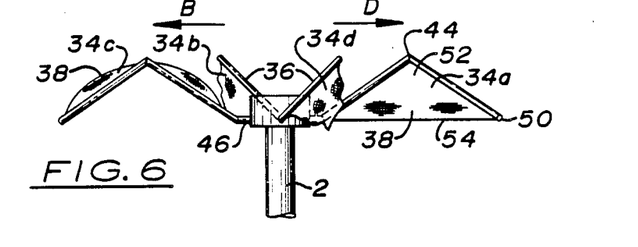
FIG. 6 is an elevational view of the windmill of FIG. 4.

A first alternative embodiment of the windmill vane of the present invention is shown in FIGS. 4-6. Vanes 34a,34b,34c,34d of the first alternative embodiment are disposed quadrantly on the hub 4 as in the preferred embodiment shown in FIGS. 1-3. In the first alternative embodiment, however, the vanes 34a,34b,34c,34d each comprise a generally chevron-shaped frame 36 and a substantially triangular flexible resilient sail 38 secured to the frame. The instantaneous directions of movement A,B,C,D of the vanes 34a,34b,34c,34d are the same as described above for the vanes 10a,10b,10c,10d of the preferred embodiment.

Each frame 36 of the first alternative embodiment comprises a first rigid straight member 40 and a second rigid straight member 42 which are rigidly joined at an apex 44 to form the generally chevron shaped frame. An inner end of the first straight member 40 is securely carried on the hub 4 by a short rigid mounting member 46 having a first end fixedly attached to the surface of the hub and a second end fixedly attached to the inner end of the first straight member. The inner end of the first straight member thus forms a proximal end 48 of the frame 36 of the first alternative embodiment. The first straight member 40 extends from the proximal end 48 outwardly and upwardly to the apex 44. The apex 44 is formed by the fixed attachment of an opposite outer end of the first straight member 40 to an inner end of the second straight member 42. The angle between the first straight member 40 and the second straight member 42 at the apex 44 can theoretically be between an acute angle greater than zero degrees (0°) and an obtuse angle less than one hundred eighty degrees (180°), although an angle between about sixty degrees (60°) and about one hundred twenty degrees (120°) is preferred, with ninety degrees (90°) considered optimal. The second straight member 42 extends from the apex 44 outwardly and downwardly to an opposite outer end forming a distal end 50 of the frame 36 of the first alternative embodiment. The distal end 50 of the frame 36 is spaced radially outwardly from the hub 4, and is aligned horizontally and radially with the proximal end 48 of the frame.

As best seen in FIG. 6, the frame 36 of the first alternative embodiment is oriented similarly to the plane of the frame 12 of the preferred embodiment. The plane of the frame 36 of each of the vanes 34a,34b,34c,34d is inclined at an angle of forty-five degrees (45°) upwardly relative to the respective instantaneous direction of movement A,B,C,D of such vane, such that a central portion of the frame near the apex 44 is positioned above the proximal end 48 and the distal end 50 of the frame and leads the proximal and distal ends relative to the instantaneous direction of movement A,B,C,D of the frame around the axis of the shaft when the shaft is rotated in the selected direction of rotation R.

The sail 38 of each vane 34a,34b,34c,34d extends continuously between an upper head edge 52 secured to the frame 36 of the vane, and a lower foot edge 54. As in the preferred embodiment, the head edge 52 is secured to the frame 36 by a sleeve, the frame fitting loosely within the sleeve of the sail. As before, one end of the sleeve is formed into a cup and the other end is attached to a hook on the frame by an elongated eyelet. When a vane is in the filled position, as shown by vane 34a in FIGS. 4-6, the sail 38 of the first alternative embodiment forms a conical section extending downwardly from the head edge 52 along the frame 36 to the foot edge 54. The chevron shape of the frame 36 prevents the sail 38 from falling vertically directly below the frame for the entire length of the frame when the wind fills the sail. However, the angle of the apex 44 of the frame 36 can be selected such that the foot edge 54 of the sail 38 falls vertically directly below the apex. When a vane is in the faired position, as shown by vane 34c in FIGS. 4-6, the sail 38 of such vane does not form a substantially smooth vertically arching surface streaming horizontally directly behind the frame, as is formed by the sail 14 of the preferred embodiment. Instead, the sail 38 forms small wrinkles which flap in the wind, thereby somewhat increasing the drag of the sail in the faired position and somewhat reducing the net efficiency of the windmill. For this reason, the semi-elliptical frame 12 is preferred over the chevron shaped frame 36 of the first alternative embodiment. However, the frame 36 of the first alternative embodiment is formed entirely of straight rigid members, which reduces its cost. Furthermore, the sail 38 of the first alternative embodiment has a relatively simpler shape than the said 14 of the preferred embodiment.

Figure 7:
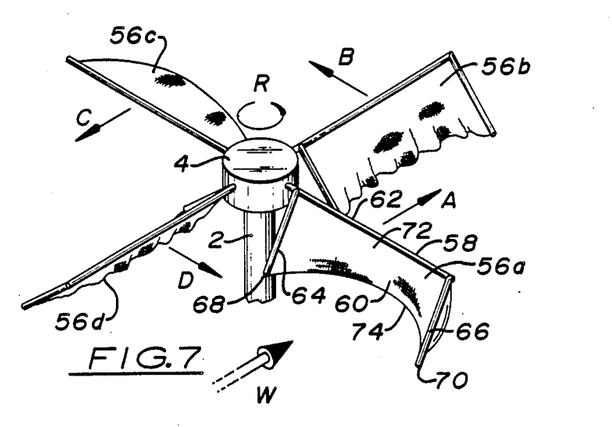
FIG. 7 is an isometric view of a vertical axis windmill with vanes according to a second alternative embodiment of the invention having open semi-rectangular support frames.
Figures 8, 9:
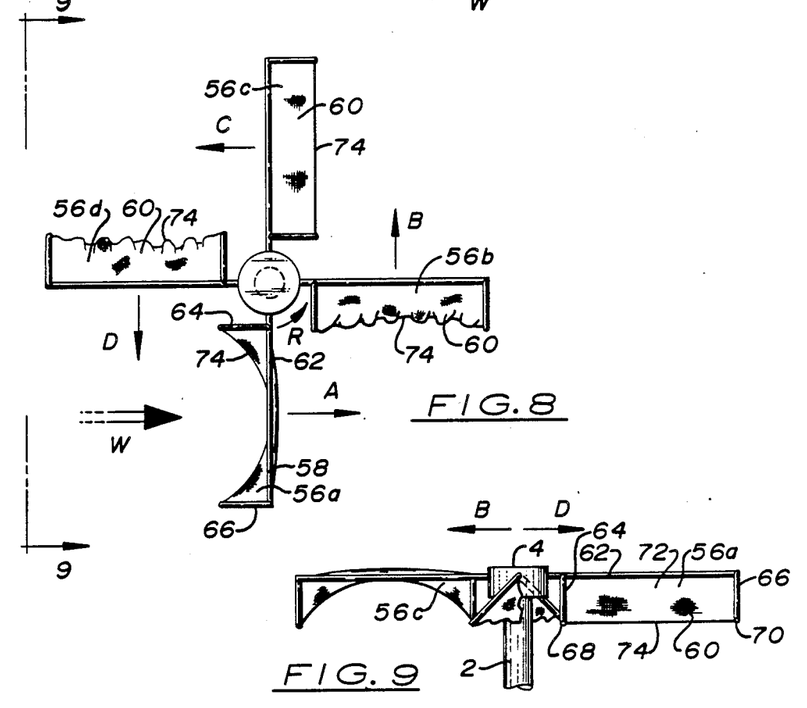
FIG. 8 is a plan view of the windmill of FIG. 7.
FIG. 9 is an elevational view of the windmill of FIG. 7.

A second alternative embodiment of the windmill vane of the present invention is shown in FIGS. 7-9. Vanes 56a,56b,56c,56d of the second alternative embodiment are disposed quadrantly on the hub 4 as in the preferred embodiment and the first alternative embodiment. In the second alternative embodiment, however, each of the vanes 56a,56b,56c,56d comprises a semirectangular shaped frame 58 and a substantially trapezoidal flexible resilient sail 60 secured to the frame. The instantaneous directions of movement A,B,C,D of the vanes 56a,56b,56c,56d are the same as described above for the preferred embodiment and the first alternative embodiment.

Each frame 58 of the second alternative embodiment comprises a relatively long horizontal arm 62 fixedly attached to and extending radially outwardly from the hub 4. A relatively short rigid straight inner end member 64 is fixedly attached perpendicularly to the horizontal arm 62 at a location relatively close to the proximal end thereof. A similar outer end member 66 is fixedly attached perpendicularly to the horizontal arm 62 at the distal end thereof. Both the inner end member 64 and the outer end member 66 depend rearwardly and downwardly from the horizontal arm. The frame 58 of the second alternative embodiment is thus an inverted U-shaped semi-rectangular planar member, with the distal end of the inner end member 64 forming an inner end 68 of the frame and the distal end of the outer end member 66 forming an outer end 70 of the frame 58. The outer end 70 of the frame 58 of the second alternative embodiment is spaced radially outwardly from the hub 4 and aligned horizontally and radially with the inner end 68 of the frame, substantially as the proximal ends 16,48 and the distal ends 20,50 of the frames 12,36 of the preferred embodiment and the first alternative embodiment respectively.

As best seen in FIG. 9, the plane of the frame 58 of the second alternative embodiment is oriented substantially the same as the frames 12,36 of the preferred embodiment and the first alternative embodiment respectively. The inner end member 64 and the outer end member 66 of each of the vanes 56a,56b,56c,56d respectively extend forwardly and upwardly from the inner end 68 and the outer end 70 of the frame to the horizontal arm 62 at an angle of forty-five degrees (45°) relative to the respective instantaneous direction of movement A,B,C,D of such vane. The horizontal arm 62 of the frame 58 of each vane 56a,56b,56c,56d forms a central portion of the frame which leads the inner end 68 and the outer end 70 of the frame relative to the instantaneous direction of movement A,B,C,D of the frame around the axis of the shaft when the shaft is rotated in the selected direction of rotation R.

The sail 60 of each vane 56a,56b,56c,56d of the second alternative embodiment extends continuously between an upper head edge 72 secured along the horizontal arm 62 of the frame 58, and a lower foot edge 74 extending across the lower opening of the frame between the inner end 68 and the outer end 70 thereof. An inner leech edge of the sail 60 is secured along the inner end member 64, and an outer leech edge of the sail is secured along the outer end member 66. As in the preferred embodiment and the first alternative embodiment, the sail 60 is secured to the frame 58 by a sleeve which fits loosely around the frame to allow rotation of the sleeve around the frame, the sleeve being removably attached to the frame by a cup at one end of the sleeve, and a hook and elongated eyelet type fastener at an opposite end of the sleeve. When a vane is in the filled position, as shown by vane 56a in FIGS. 7-9, the sail 60 forms a tautly filled areal surface extending downwardly from the straight head edge 72 to the foot edge 74. The semi-rectangular shape of the frame 58 prevents the sail 60 from falling vertically directly below the frame. Instead, as best seen in the plan view of FIG. 8, the foot edge 74 of the sail 60 of the vane 56a in the filled position follows a substantially catenary shaped horizontal curve between the inner end 68 and the outer end 70 of the frame 58, and the sail 60 forms a slight central billow leading the horizontal arm 62. When a vane is in the faired position, as shown by vane 56c in FIGS. 7-9, the sail 60 of such vane does not form a smooth surface streaming horizontally directly behind the frame, as in the preferred embodiment. Instead, the sail 60 of the second alternative embodiment forms wrinkles which flap in the wind, thereby increasing the drag of the sail in the faired position and reducing the net efficiency of the windmill. Thus for reasons of efficiency, the semi-elliptical frame 12 and the chevron-shaped frame 36 are preferred over the semi-rectangular frame 58 of the second alternative embodiment. However, the frame 58 of the second alternative embodiment requires no special mounting member fixedly attaching the frame to the hub 4, because the frame is secured directly to the hub by the proximal end of the horizontal member 62. Furthermore, the sail 60 of the second alternative embodiment has a substantially rectangular shape which is relatively simply and economically constructed. Finally, the rectangularly shaped vanes 56a,56b,56c,56d are particularly suited to being arranged in vertically stacked arrays wherein the horizontal arm 62 of the sail 60 of a selected lower vane is in close proximity to the foot edge 74 of an upper vane vertically aligned with and superposed above such lower vane, thus presenting a substantially continuous series of vertically aligned sails which captures a relatively high percentage of the available wind power.

The several embodiments of the present invention provide a highly efficient windmill vane having only one moving part—a sail. The simplicity, economy and inherent reliability of the designs of the present invention are in particular contrast to the designs of the prior art, which rely on complex assemblies of tethers, sails and arms to ensure that the sails produce little drag when moving against the wind.

It is to be understood that the present invention is not limited to a vane extending horizontally and radially outwardly from a hub rotating around a vertical axis, and having a planar frame inclined upwardly at an angle of forty-five degrees (45°) relative to the instantaneous direction of movement of such vane, and having a central portion of the frame leading the proximal and distal ends thereof relative to such instantaneous direction of movement. The vane can be positioned extending radially outwardly perpendicularly to the shaft, or can be positioned parallel to and spaced radially outwardly from the shaft, or can take any position between these two positions, provided only that the frame is open and planar with a central portion leading the ends of the frame relative to the instantaneous direction of movement of the frame around the axis of the shaft. The forty-five degree (45°) inclination of the plane of the frame relative to such instantaneous direction of movement can be in any direction relative thereto. Thus, vanes extending horizontal and radially outwardly from a vertically rotating shaft or hub can be inclined either upwardly, as in the above-described embodiments, or downwardly such that the central portion of the frame is positioned downwardly from the ends of the frame. Vertically oriented vanes spaced outwardly from and parallel to a vertically rotating shaft can have planar frames inclined either outwardly away from the shaft or inwardly toward the shaft.

As seen in FIG. 11, a vertically oriented vane 76 of a third alternative embodiment comprises a chevron shaped frame 78 substantially similar to the chevron shaped frame 36 of the first alternative embodiment. The vertically oriented frame 78 is securely carried on the shaft 2 by mounting member 80. The mounting member 80 has a first end fixedly attached to the shaft 2 or to the hub 4, and a second end fixedly attached to the frame 78 at or near the apex thereof. The upper and lower ends 82,84 of the frame 78 are spaced radially outwardly from the shaft 2 and aligned vertically parallel to the axis of the shaft. The plane of the frame 78 is oriented at an angle of forty-five degrees (45°) inwardly relative to the instantaneous direction of movement A of the vane 76. The frame 78 is angled inwardly rather than outwardly in order to minimize the moment produced by aerodynamic drag of the sail 86 at or near the apex of the frame when the sail is moving against the wind. The sail 86 of the vertical vane 76 includes a sleeve 88 which fits loosely around the frame 78 to allow rotation of the sleeve around the frame. The sleeve 88 is suitably removably attached to the frame 78 by cups 90 at the ends of the sleeve and interengaging snaps or the like 92 attached at intervals along the sleeve. Interengaging portions of each snap 92 are arranged laterally along the length of the sleeve 88 so that the sleeve may be closed around the frame 78 to secure the sail 86 to the frame, or opened to remove the sail 86 from the frame.

The preferred, first and second embodiments of the present invention are described herein as comprising substantially horizontal vanes extending radially outwardly from a vertically rotating hub, with planar frames inclined upwardly relative to the horizontal instantaneous direction of movement of such frames, because such an orientation allows the sail to fall naturally under the influence of gravity from the faired position streaming behind the frame into the filled position extending downwardly from the frame. It should be noted that the drag produced by the sails mounted on the chevron shaped frame 36 and the semi-rectangular frame 58 is mainly centered around the corners of the frame, and these corners are preferably closer to the shaft in embodiments having vertically oriented vanes, as shown in FIG. 11. The moment produced by the vertically oriented vane in the faired position will thereby be reduced at the expense of help from gravity at low wind velocity.

It is to be understood that a windmill having vanes according to the present invention may be strengthened by connecting the ends of the frames of such vanes, as by wires extending around the array of vanes.

The above-described embodiments are intended to be illustrative, not restrictive. The scope of the invention is defined by the claims, construed in accordance with established legal principles, and any and all equivalents are to be considered within the scope thereof.

What is claimed is:

1. A windmill vane for use in a windmill having a shaft disposed for rotation by the wind in a selected direction around the longitudinal axis of the shaft, said vane comprising:
   (a) a rigid, generally open, generally planar frame standing out from and fixedly carried by the shaft, the frame having a central portion and first and second ends, the frame being oriented in a plane with the central portion of the frame leading the ends thereof relative to the instantaneous direction of movement of the frame around the shaft, such plane being inclined at an angle of about forty-five degrees (45°) relative to such instantaneous direction of movement; and
   (b) a sail comprising a light weight, resilient substantially wind resistant material, the sail extending continuously between
      (i) a head edge attached along the frame, and
      (ii) a foot edge extending continuously between the ends of the frame and being otherwise unattached thereto; the orientation of the frame and the length of the foot edge of the sail being such that the sail is full when moving with the wind and streams behind the frame and has minimal drag when moving across and against the wind.

2. A windmill vane an recited in claim 1, wherein the frame forms a half-ellipse.

3. A windmill vane as recited in claim 2, wherein a portion of the sail adjacent the central portion of the frame is substantially perpendicular to the instantaneous direction of movement of the frame when the sail is full.

4. A windmill vane as recited in claim 1, wherein the first and second ends of the frame are aligned radially outwardly from the shaft.

5. A windmill vane as recited in claim 1, wherein the shaft of the windmill rotates around a vertical axis.

6. A windmill vane as recited in claim 5, wherein the first and second ends of the frame are aligned horizontally and radially outwardly from the shaft.

7. A windmill vane as recited in claim 6, wherein the plane of the frame is inclined upwardly relative to the reference plane.

8. A windmill vane for use with a windmill having a vertical shaft disposed for rotation by the wind in a selected direction around a vertical axis, said vane comprising:
   (a) a rigid, generally open planar frame standing out from and fixedly carried by the shaft, the frame having a central portion, a first end, and a second end aligned horizontally and radially outwardly from the shaft with the first end, the frame being oriented in a plane with the central portion of the frame leading the ends thereof relative to the instantaneous direction of movement of the frame around the shaft, such plane being inclined at an angle of about forty-five degrees (45°) upwardly relative to such instantaneous direction of movement; and
   (b) a sail carried by the frame, the sail comprising a light weight, resilient substantailly wind resistant material, the sail extending continuously between
      (i) a head edge securely attached along the frame, and
      (ii) a foot edge extending continuously between the first and second ends of the frame and being otherwise not attached to the frame; the orientation of the frame and the length of the foot edge of the sail being such that the sail is full when moving with the wind and streams behind the frame and has minimal drag when moving across and against the wind.

9. A windmill vane as recited in claim 8, wherein the frame forms a half-ellipse.

10. A windmill vane as recited in claim 8, wherein the frame forms a chevron subtending an internal angle of between about sixty degrees (60°) and about one hundred twenty degrees (120°).

11. A windmill vane as recited in claim 10, wherein the frame forms a chevron subtending an internal angle of about ninety degrees (90°).

12. A windmill vane as recited in claim 8, wherein the frame forms three sides of a rectangle.

13. A windmill vane as recited in claim 8, wherein a portion of the sail adjacent the central portion of the frame is substantially perpendicular to the instantaneous direction of movement of the frame when the sail is full.

14. A windmill vane as recited in claim 8, wherein the sail comprises nylon fabric.

15. A windmill vane as recited in claim 8, wherein the sail is securely attached along the length of the frame by a flexible sleeve fixedly attached along the head edge of the sail, the sleeve enclosing the frame.

16. A windmill vane for use with a vertical axis windmill having a vertical shaft disposed for rotation in a selected direction around a vertical axis and having a hub fixedly attached to the shaft, said vane comprising:
   (a) a rigid, generally open planar frame having the shape of a half-ellipse, the frame including
      (i) a proximal end fixedly attached to the hub of the shaft,
      (ii) a distal end aligned horizontally and radially outwardly from the shaft with the proximal end, and
      (iii) a central portion located about midway between the proximal and distal ends of the frame, the frame being oriented in a plane with the central portion of the frame leading the ends thereof relative to the instantaneous direction of movement of the frame around the shaft, such plane being inclined at an angle of about forty-five degrees (45°) upwardly relative to such instantaneous direction of movement; and
   (b) a light weight, resilient substantially wind resistant sail carried by the frame, the sail extending continuously between
      (i) a head edge securely attached along the frame, and
      (ii) a foot edge extending continuously between the proximal and distal ends of the frame, a portion of the foot edge being positioned substantially directly below the central portion of the frame when the sail is full; the orientation of the frame and the length of the foot edge of the sail being such that the sail is full when moving with the wind and streams directly behind the frame and has minimal drag when moving across and against the wind.

17. A windmill vane as recited in claim 16, wherein the sail comprises nylon fabric.

18. A windmill vane as recited in claim 15, wherein the sail includes a flexible sleeve attached along the head edge of the sail, the sleeve enclosing the frame so as to securely carry the sail on the frame.

19. A windmill vane as recited in claim 18, wherein the frame includes a projecting fastener positioned at the proximal end thereof, and wherein the sleeve includes a cup located at one end thereof and attachment means located at an opposite end thereof for removably attaching the opposite end of the sleeve to the fastener of the frame, such that the sleeve is securely yet removably attached to the frame.

* * * * *